US006990116B1

(12) United States Patent
Young et al.

(10) Patent No.: US 6,990,116 B1
(45) Date of Patent: Jan. 24, 2006

(54) METHOD AND SYSTEM FOR IMPROVING THROUGHPUT OVER WIRELESS LOCAL AREA NETWORKS WITH MODE SWITCHING

(75) Inventors: Albert Young, Cupertino, CA (US); BoFu Chen, Fremont, CA (US); Bob O'Hara, Santa Clara, CA (US); Seema Nayek, San Jose, CA (US); Tim Schardt, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 746 days.

(21) Appl. No.: 09/759,770

(22) Filed: Jan. 12, 2001

(51) Int. Cl.
*H04L 12/413* (2006.01)
(52) U.S. Cl. .................... 370/445; 370/338; 370/462
(58) Field of Classification Search ............... 370/445, 370/328, 329, 449, 229, 230, 231, 232, 235, 370/252, 253, 462, 437, 338, 346
See application file for complete search history.

(56) References Cited

U.S. PATENT DOCUMENTS

| 6,584,080 B1 * | 6/2003 | Ganz et al. ................. 370/315 |
| 6,721,331 B1 * | 4/2004 | Agrawal et al. ............ 370/448 |
| 6,747,968 B1 * | 6/2004 | Seppala et al. ............ 370/338 |
| 6,813,260 B1 * | 11/2004 | Fogle .......................... 370/338 |

* cited by examiner

*Primary Examiner*—Brian Nguyen (57) ABSTRACT

A method and system for increasing the overall network throughput over a wireless local area network (WLAN). Specifically, in one embodiment of the present invention, the dynamic switching between the Distributed Coordination Function (DCF) and Point Coordination Function IEEE 802.11 access modes is determined according to the load conditions over the WLAN in a method and system. Stations and access points within a WLAN monitor conditions within the network to determine which access mechanism is most optimum for the current load conditions. Some factors to consider in determining the load conditions include but are not limited to the number of transmissions, number of receptions, and number of collisions.

28 Claims, 6 Drawing Sheets

METHOD AND SYSTEM FOR IMPROVING THROUGHPUT OVER WIRELESS LOCAL AREA NETWORKS WITH MODE SWITCHING

BACKGROUND OF THE INVENTION

1. Field of the Invention

The present invention relates to the field of increasing throughput in wireless local area network communications.

2. Related Art

A wireless local area network (WLAN) is a transmission system that provides for network access between electronic devices that are wireless stations using radio waves instead of direct cable connections. An AP is a wireless station with additional functionality. In the IEEE 802.11 standard, the WLAN consists of a number of basic service sets (BSS) that are joined by a distribution system into an extended service set (ESS). Within the ESS, a mobile unit or end station may roam at will while continuously maintaining a connection to the network.

Each BSS is controlled by an access point (AP). Each AP communicates with the end stations over the wireless medium in its BSS. The AP communicates with other APs and other nodes on the network via the distribution system. A function of the AP, among many others, is to relay network traffic from the end stations in its BSS through the distribution system to the destination. The destination of this traffic may be another end station in the same, or different, BSS, or the destination may be a node on a wired LAN (such as ethernet) connected to the distribution system. The AP provides this relaying function for multiple wireless end stations simultaneously. The relaying of traffic for multiple end stations results by the AP in an asymmetric distribution of the load entering a BSS.

The IEEE 802.11 standard uses a default or basic access mechanism implemented in the 802.11 Medium Access Control (MAC) layer. The 802.11 MAC layer protocol is called the Distributed Coordination Function (hereinafter referred to as "DCF"), that provides fair access to all users of the WLAN.

For example, in a BSS where the AP is relaying traffic for nine end stations, and where the traffic from each end station generates an equal amount of returned traffic to that end station, the IEEE 802.11 standard provides for the default DCF access mechanism to provide fair access to all users, including the AP, of the WLAN.

In the foregoing example, the available bandwidth of the BSS would be shared equally among the nine end stations and the AP, with each approximately receiving ten percent of the available bandwidth. In a sense, there is symmetric access to the network, where none of the end stations nor the AP have network access priority over the other users.

When using DCF access mechanism, a station that senses that the transmission medium is available is allowed to transmit over the WLAN. If the medium is not available, then the station waits for a certain time before trying to transmit again. This waiting period is a called a backoff period. The IEEE 802.11 standard and its variations uses Carrier Sense Multiple Access with Collision Avoidance (CSMA/CA) mechanism with a random backoff period for wireless connectivity between fixed, portable, and moving stations within a local area.

In another example, a scenario may exist where the end stations offer only half of the load to the BSS and the other half of the load is offered by the AP. If the total offered load of the AP and the wireless end stations is less that the available bandwidth of the BSS, the DCF access mechanism will be able to service the entire offered load.

However, as the offered load approaches the available bandwidth, the number of collisions caused by the use of the DCF access mechanism increases dramatically, adding significant delay to the delivery of the traffic. Eventually, the bandwidth lost to collisions plus the offered load from the end stations and the AP exceed the available bandwidth of the BSS and the delay suffered by the traffic approaches infinity. Thus, a need exists to provide a more efficient use of bandwidth through a wireless local area network, especially when the load conditions are heavy.

SUMMARY OF THE INVENTION

The present invention provides an apparatus and method which increases the overall network throughput over a wireless local area network (WLAN) during periods where the load conditions are heavy.

Specifically, in one embodiment of the present invention, the access point dynamically changes between distributed coordination function (DCF) and point coordination function (PCF) modes as a function of the load conditions over a wireless local area network in a method and system. The DCF and PCF access mechanisms follow the IEEE 802.11 communications standard and its variations. Some factors to consider in determining when to change modes include but are not limited to the following: the number of collisions, the number of packets to be delivered in the queue at the access point, to which stations the packets are to be delivered from the access point, and the number of stations within the access point's basic service set (BSS).

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The drawings referred to in this description should be understood as not being drawn to scale except if specifically noted.

DETAILED DESCRIPTION OF THE INVENTION

Reference will now be made in detail to the preferred embodiments of the present invention, a method and system for increasing throughput in a wireless local area network (WLAN), examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

IEEE 802.11 Communication Standard

Some embodiments of the present invention are discussed primarily in a context in which devices and systems are coupled using wireless links, and specifically with regard to devices and systems compliant with the IEEE 802.11 communication standard. However, it is appreciated that the present invention may be utilized with devices and systems coupled using technologies, standards, and/or communication protocols other than the IEEE 802.11 communication standard.

Figure 1:
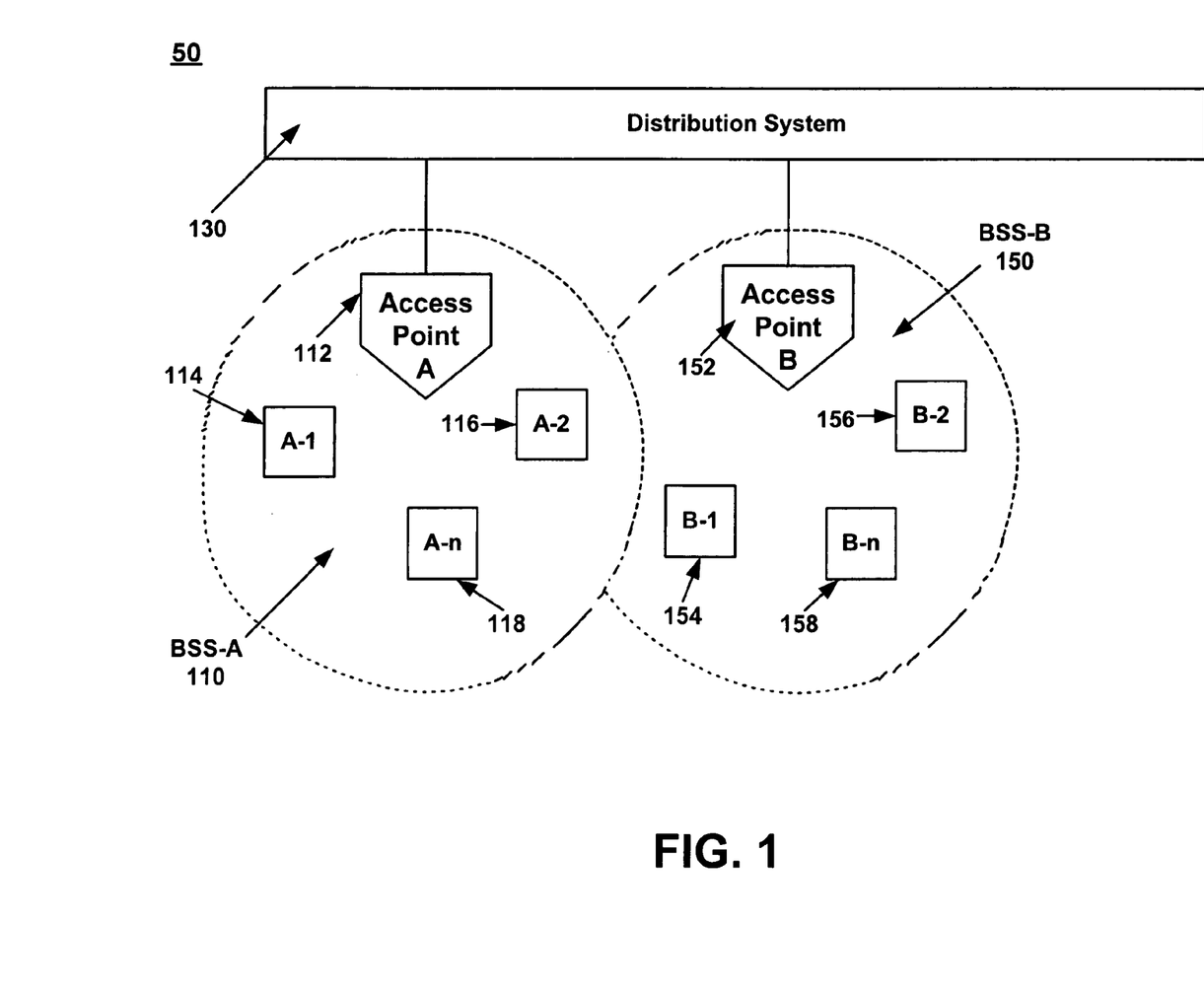
FIG. 1 illustrates a block diagram of a communication network environment that follows the IEEE 802.11 protocol in accordance with one embodiment of the present invention.

The IEEE 802.11 standard defines two modes of operation: infrastructure mode and ad hoc mode. In the infrastructure mode as shown in FIG. 1, the communication network 50 is comprised of wired and wireless networks. The wireless network consists of at least one access point (AP) connected to the wired network infrastructure and a set of wireless end stations. This configuration describes a cell unit called a basic service set (BSS). Furthermore, an Extended Service Set (ESS) is a set of two or more BSSs forming a single subnetwork. Most corporate WLANs require access to the wired LAN for services (file servers, printers, Internet links) and would operate in the infrastructure mode.

The ad hoc mode (also called peer-to-peer mode or an Independent Basic service Set, or IBSS) is simply a set of 802.11 wireless stations that communicate directly with one another without using an access point or any connection to a wired network. This mode is useful for quickly and easily setting up a wireless network anywhere that a wireless infrastructure does not exist or is not required for services, such as a hotel room, convention center, or airport, or where access to the wired network is barred (such as for consultants at a client site).

FIG. 1 shows two basic service sets in a communication network 50 operating in infrastructure mode, BSS-A 110 and BSS-B 150. In BSS-A 110, an access point AP-A 112 is wired to the distribution system 130. Various end stations, A-1 114, A-2 116, on up to A-n 118 are connected to AP-A through a wireless connection. Similarly, in BSS-B 150, an access point AP-B 152 is wired to the distribution system 130. Various end stations, B-1 154, B-2 156, and on up to B-n 158 are connected to AP-B 152 through a wireless connection. The network 50 could support and operate with more than two basic service sets.

The IEEE 802.11 standard defines two pieces of equipment, a wireless end station, which is usually a personal computer (PC) equipped with a wireless network interface card (NIC), but could be any electronic device operable under the 802.11 standard, and an access point (AP), which acts as a bridge between the wireless and wired networks.

Wireless end stations can be 802.11 PC Card, Peripheral Component Interconnect (PCI), or Industry Standard Architecture (ISA) NICs, or embedded solutions in non-PC clients (such as an 802.11-based telephone handset).

An access point usually consists of a radio, a wired network interface (e.g. 802.3), and bridging software conforming to the 802.11 bridging standard. The AP acts as the base station for the wireless network, aggregating access for multiple wireless stations onto the wired network, such as the distribution system 130 in FIG. 1.

Each BSS is controlled by an access point (AP). Each AP communicates with the end stations over the wireless medium in its BSS. The AP communicates with other APs and other nodes on the network 50 via the distribution system 130. A function of the AP, among many others, is to relay network traffic from the end stations in its BSS through the distribution system to the destination. The destination of this traffic may be another wireless end station in the same, or different, BSS, or the destination may be a node on a wired LAN (such as ethernet) connected to the distribution system. The AP provides this relaying function for multiple wireless end stations simultaneously. The relaying of traffic for multiple wireless end stations results in an asymmetric distribution of the load entering a BSS.

The IEEE 802.11 standard uses a default or basic access mechanism implemented in the IEEE 802.11 Media Access Control (MAC) layer. The 802.11 MAC layer protocol is called the Distributed Coordination Function (hereinafter referred to as "DCF"), that provides fair access to all users of the WLAN.

Additionally, since stations on a network using radio transceivers cannot transmit and receive simultaneously on a single channel, the IEEE 802.11 wireless local area networking standard use a Carrier Sense Multiple Access/ Collision Avoidance (CSMA/CA) method when operating under the DCF access mechanism. Also, the IEEE 802.11 standard uses CSMA/CA collision avoidance mechanism together with a positive acknowledgment of packets received to determine access to the network.

Figure 2:
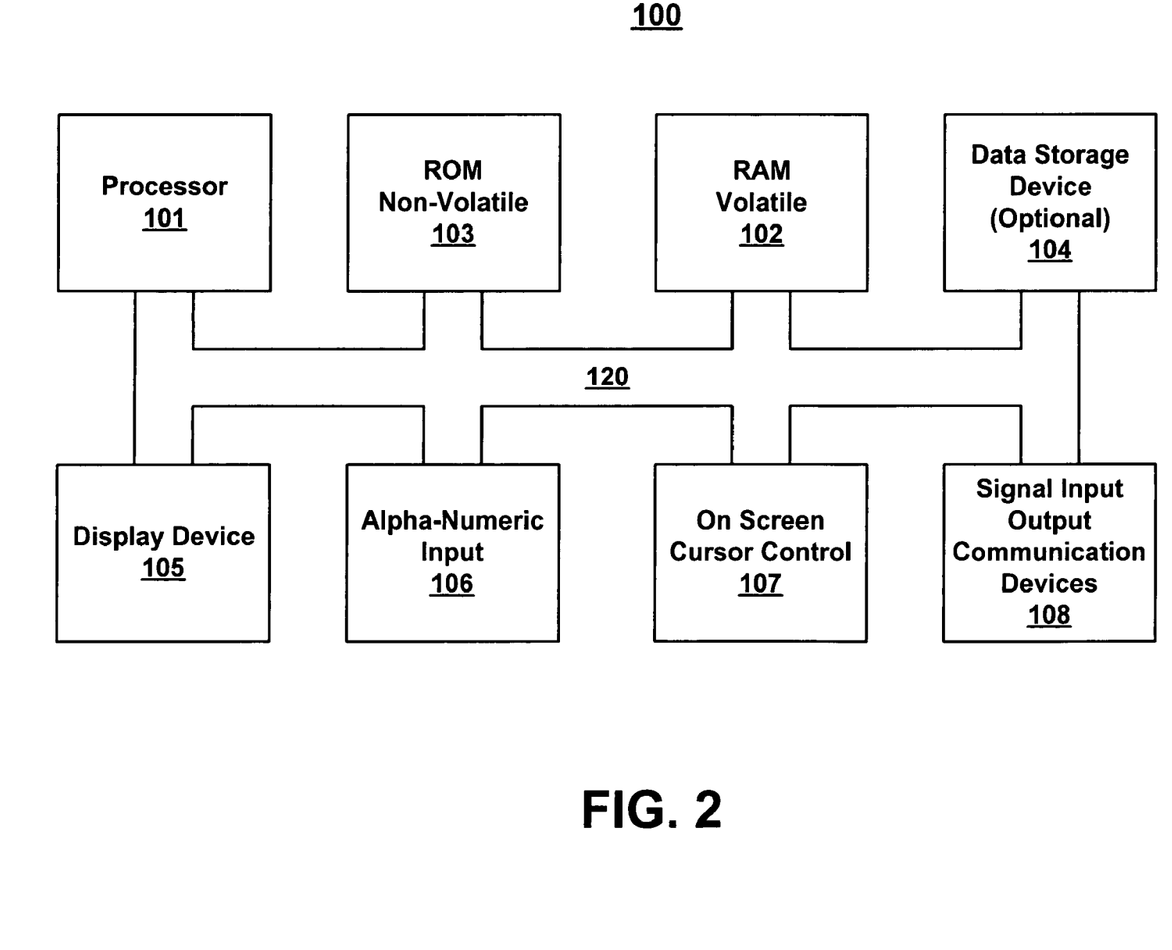
FIG. 2 is a schematic diagram of an exemplary computer system used to perform steps in determining when to change from DCF to PCF mode and vice versa, in accordance with one embodiment of the present invention.

Referring to FIG. 2, portions of the methods and systems for dynamic mode switching are comprised of computer-readable and computer executable instructions which reside, for example, in computer-usable media of a computer system. FIG. 2 illustrates an exemplary computer system 100 used to perform the dynamic distributed coordination function (DCF) and point coordination function (hereinafter referred to as "PCF") mode switching for an access point in accordance with embodiments of the present invention. It is appreciated that system 100 of FIG. 2 is exemplary only and that the present invention can operate within a number of different computer systems including general purpose networked computer systems, embedded computer systems, and stand-alone computer systems. Additionally, computer system 100 of FIG. 2 is well adapted to having computer readable media such as, for example, a floppy disk, a compact disc, and the like coupled thereto. Such computer readable media is not shown coupled to computer system 100 in FIG. 2 for purposes of clarity.

System 100 can include any computer-controlled software application for determining the optimum periods for DCF and PCF operation. In general, computer system 100 comprises an address/data bus or other communication means 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, a non-volatile memory 103 (e.g., read only memory (ROM), programmable ROM, flash memory, EPROM, EEPROM, etc.) coupled with the bus 120 for storing static information and instructions for the processor 101, a data storage device 104 (e.g., memory card, hard drive, optical disk, etc.) coupled with the bus 120 for storing information and instructions. System 100 of the present invention also includes an optional display device 105 coupled to the bus 100 for displaying information to the computer user. System 100 also optionally includes an alphanumeric input device 106 including alphanumeric and function keys coupled to the bus 120 for communicating information and command selections to the central processor 101. System 100 also optionally includes a cursor control device 107 coupled to the bus for communicating user input information and command selections to the central processor 101, and an Input/Output (I/O) device 108 coupled to the bus 120 for providing a communication link between computer system 100 and a network environment.

The display device 105 of FIG. 2 utilized with the computer system 100 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices or by other means such as, for example, voice commands. A more detailed discussion of the dynamic selection of minimum values for a contention window method and system embodiments of the present invention is found below.

Distributed Coordination Function Access Mechanism

Local area networking standards, such as the IEEE 802.11 standard, use a primary access mechanism called Distributed Carrier Sense Multiple Access with Collision Avoidance (CSMA/CA). The CSMA/CA protocol involves selecting a delay of a random length whenever a station detects that the medium is busy. This random delay is selected from a "contention window" that begins with a minimum value. For each subsequent collision event or busy condition of the medium that is detected for a given transmission, the contention window size is approximately doubled and a new random delay is selected from the new contention window. A random delay is also selected after each successful transmission by a station to prevent contiguous tranmissions by a single station. The IEEE 802.11 standard and its variations use the CSMA/CA protocol for transmission over the wireless local area network where each of the stations and the access point (AP) operate under a DCF access mechanism.

Figure 3:
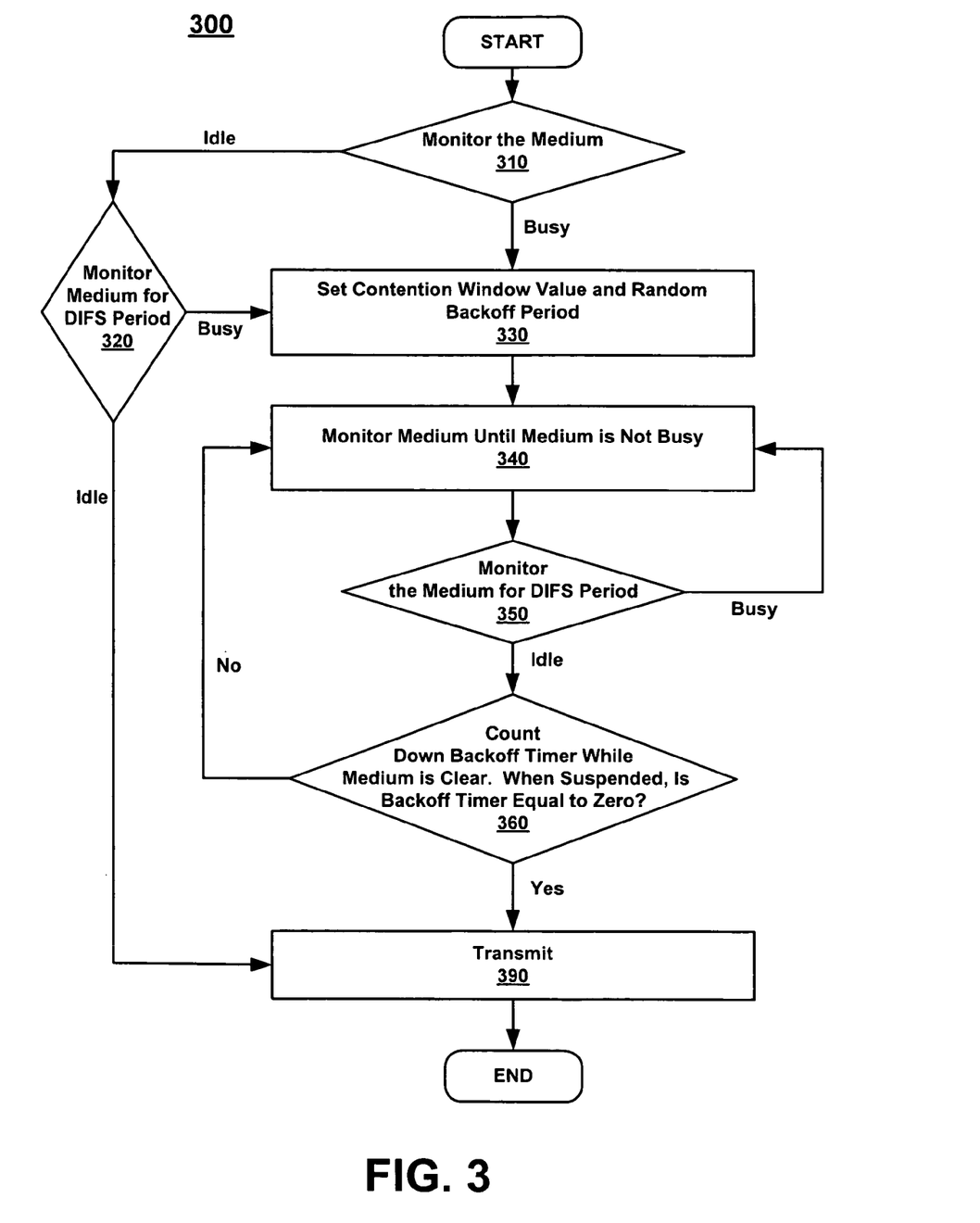
FIG. 3 is a flow chart of steps performed for the operation of the CSMA/CA contention based IEEE 802.11 distributed coordination function (DCF) access mechanism.

FIG. 3 illustrates the DCF access mechanism in process 300 in one embodiment of the present invention. When using the DCF access mechanism, a station wanting to transmit a data frame senses the transmission medium or channel in step 310. Following the case where the medium is completely idle through process 300, if the medium is idle in step 310, then the station waits for an interval called distributed interframe space (DIFS) in step 320. If the medium again remains idle, then the process 300 skips to step 390 and transmits the data frame.

However, if in step 310 or 320 the medium is busy, then process 300 proceeds to step 330 where the contention window is set in the present embodiment. A backoff period is also randomly set from within this contention window in step 330. This backoff period sets the amount of time for a backoff counter to decrement to allow the station to transmit the data frame.

After the backoff period is set, the process proceeds to step 340 where the station defers transmission and monitors the medium until the current transmission is completed. In step 350, the station monitors the transmission medium for another DIFS period. If the medium becomes busy, then process 300 goes back to step 340. However, if the medium remains idle, then the process proceeds to step 360.

In step 360, the station begins to count down or decrement the backoff period set in the backoff counter. Whenever the channel is clear, the countdown continues. If the station senses the channel is busy, then the backoff counter suspends the countdown until the channel is clear again whereupon it waits again for a DIFS period, and then starts to count down again. When the backoff counter reaches zero, then the station is allowed to transmit the data frame in step 390.

It is understood that process 300 of FIG. 3 is exemplary of the IEEE 802.11 communication standard. Any other process by which a station delays its transmissions utilizing either local information only or a combination of local information and information received from other stations may be substituted for process 300.

The receiving station checks the cyclic redundancy check (CRC) of the received packet and sends an acknowledgment packet (ACK) back to the transmitting station. When the transmitting station receives the ACK from the receiving station, then the transmission was successful. However, if the transmitting station does not receive the ACK, it will continue to retransmit until the transmission is successful up to a given number of retransmissions upon which point the packets are discarded.

Process 300 relies on Physical Carrier Sense, where the assumption is made that each station can hear all the other stations within a BSS. However, one station may not always be able to hear another station within its BSS. In order to reduce collisions because one station cannot hear another station, the IEEE 802.11 standard defines a Virtual Carrier Sense mechanism.

The Virtual Carrier Sense mechanism relies on the fact that the access point (AP) is able to hear all the stations within a BSS. In this mechanism, a station is able to reserve the transmission medium for a specified period of time. The station wanting to transmit a data frame first transmits a short request to send (RTS) control packet to the AP which includes the source, destination, and duration of the following transmission. Upon receipt of the RTS, the AP responds with a clear to send (CTS) frame which specifies the period of time for which the medium is reserved. All stations receiving either the RTS or CTS frames will set their network allocation vector (NAV) accordingly for the given duration and will use this information together with the physical carrier sense when sensing the medium to determine whether the medium is busy or idle.

In process 300, the backoff algorithm provides a method for reducing the contention between different stations wanting to access a transmission medium. The backoff algorithm in process 300 is executed in the following three cases in one embodiment of the present invention, as follows: 1) when the station senses the medium is busy before the first transmission of a data frame; 2) after each retransmission; and 3) after each successful transmission. Unfortunately, process 300 introduces increasing backoff periods as well as collisions which decreases overall throughput over the communication network, especially as the load condition increases to and goes beyond the carrying capacity of the DCF access mechanism.

Improvement of Throughput by Dynamically Alternating Between Distributed Coordination Function and the Point Coordination Function Modes The IEEE 802.11 communication standard and its variations offers an alternative access mechanism, the Point Coordination Function (hereinafter referred to as "PCF"), also known as the contention free period, that allows a point coordinator at the access point (AP) to directly control access to the wireless medium in its basic service set (BSS). Using this alternative access mechanism, the access point (AP) gains control of the wireless medium during PCF operation and prevents any of the wireless end stations from accessing the medium for their own transmissions, unless they are polled and given access to the medium by the AP. Further, the AP ensures that the medium does not become idle for greater than a known period of time (called the PCF interframe space, commonly known as "PIFS").

Figure 4:
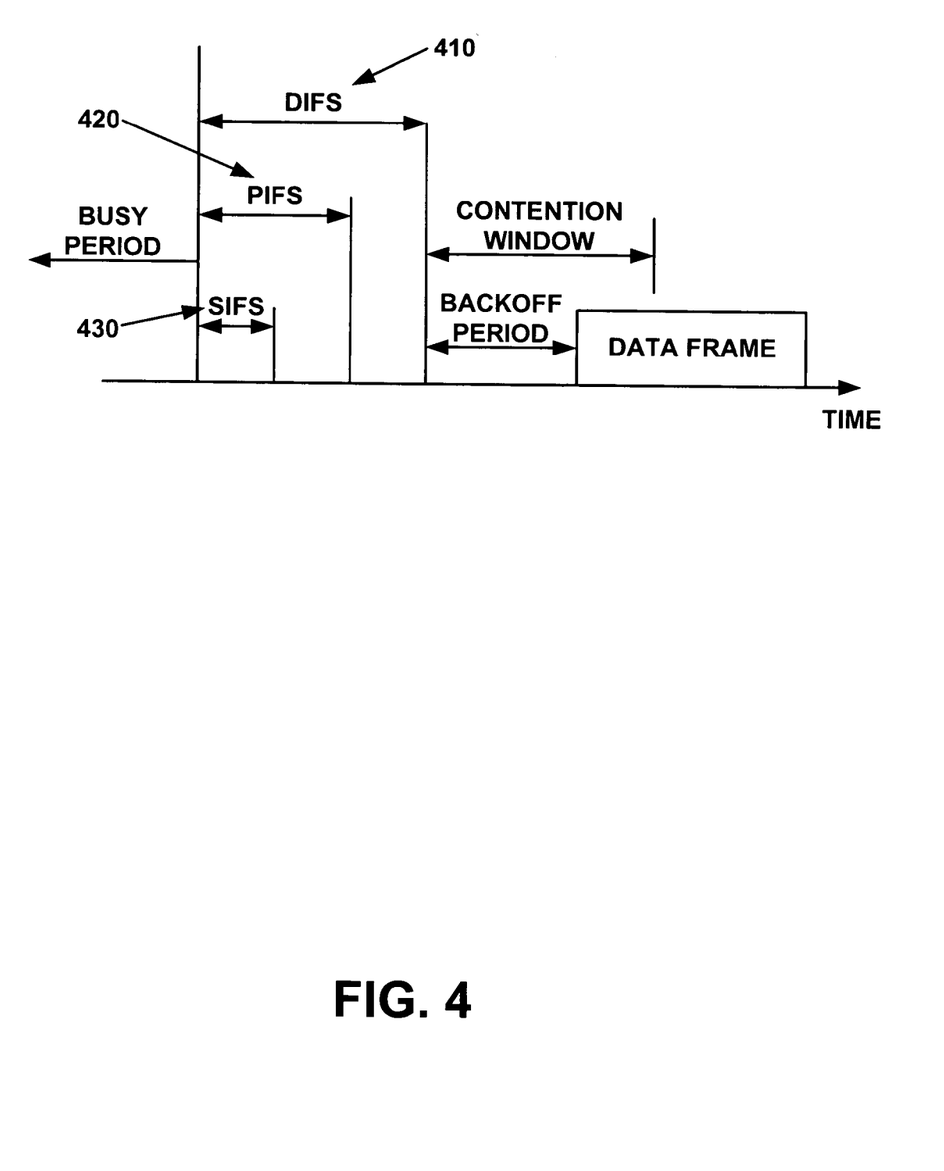
FIG. 4 is a schematic diagram illustrating the interframe space periods in an IEEE 802.11 communication standard.

The priority based PCF mode provides for contention free frame transfer. Under the PCF mode, the point coordinator at the AP controls the transmissions from all the stations in the AP's BSS. FIG. 4 illustrates how the point coordinator gains control of the medium after a PCF interframe space (PIFS) 420 at the beginning of a contention free period. Prior to PCF mode, all stations are operating under the DCF mode. In FIG. 4, the PIFS 420 is of a shorter period than the DIFS 410 for the DCF access mechanism. The short interframe space (SIFS) 430 has the highest priority for accessing the medium for sending frames such as the acknowledgment (ACK) and clear to send (CTS) frames. Since PIFS is shorter than DIFS, the point coordinator can gain and maintain control during contention-free periods by waiting a shorter time for access to the medium than stations operating under the DCF access mechanism, which must wait for a DIFS period as discussed previously.

Figure 5:
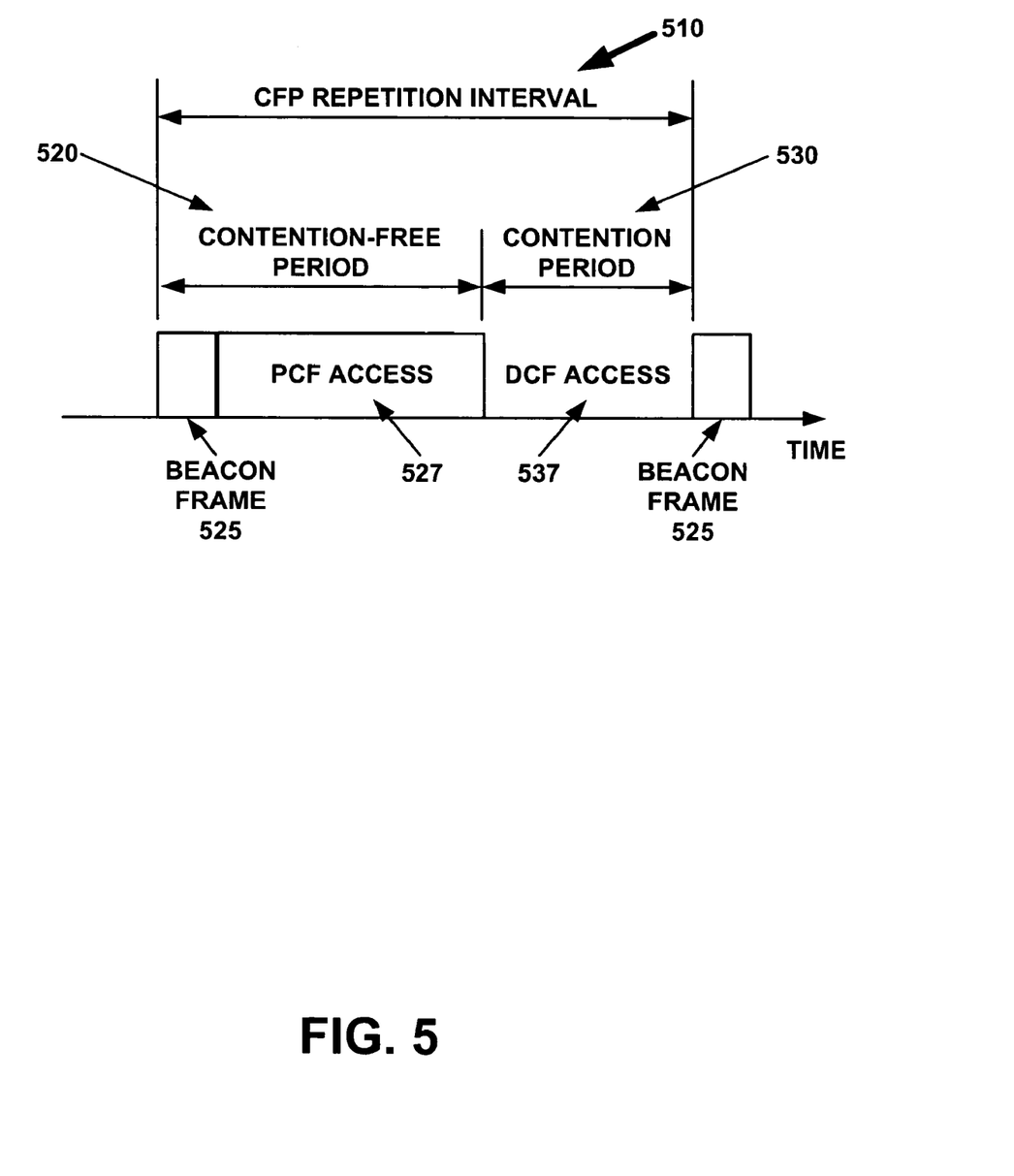
FIG. 5 is a schematic diagram illustrating the contention-free period in a PCF access mechanism.

Further, the point coordinator sends out polling requests to individual stations to control access to the medium during the contention-free period. Because a point coordinator can lock out all asynchronous traffic by repeatedly issuing polls, the IEEE 802.11 standard provides for DCF access to allow for stations to access the medium. FIG. 5 shows how the contention-free repetition interval 510 allows for a contention period 530 after the contention-free period 520. In the contention period 530, or DCF access period 537, all stations access the medium using the DCF access mechanism. It is important to note that the length of the contention free period 520, and thus the contention period 530, can vary within the CFP interval 510 depending on the load conditions over the network.

In FIG. 5, in order to gain access to the medium, the point coordinator sends a beacon frame 525 after the idle PIFS period to all the stations in its BSS. The beacon frame communicates to the stations the length of the contention-free period, where the point coordinator controls the medium during the PCF access period 527. The stations, upon receiving the beacon frame, update their network allocation vector (NAV) allowing only the point coordinator to control the medium during the contention-free period. After sending the beacon frame, the point coordinator can transmit or allow other stations access to the medium during the contention-free period 520.

When the alternative PCF access mechanism is in use, the collisions caused by the default DCF access mechanism are eliminated and the time between transmissions is significantly reduced. By dynamically alternating between DCF and PCF modes, bandwidth becomes available as the load conditions increase for relaying of traffic that was unusable by the primary access mechanism, the distributed coordination function (DCF).

For contextual purposes, the methods and system for dynamically switching between the DCF and PCF access mechanisms can be used in a wireless local area network that follows the IEEE 802.11 communication standard and its variations. However, the present invention is well suited to being used with other types of wireless communications protocols and standards.

In one embodiment of the present invention, the point coordinator through the access point dynamically changes between DCF and DCF modes or access mechanisms as a function of the load conditions over a wireless local area network in a method and system. The dynamic switching to the PCF access mechanism improves overall network throughput in a WLAN as the network load increases beyond the normal carrying capacity of the WLAN during the primary DCF access mechanism.

Improving the throughput in a single BSS when the offered load exceeds that which can be carried in DCF mode, can be done by intelligently enabling the alternative PCF access mechanism. During the PCF mode, the AP is given a higher priority when accessing the wireless medium. In one embodiment of the present invention, the AP can recognize when such a switch in access mechanisms is desirable by examining one or more local variables that indicate the rate at which collisions are occurring on the wireless medium, the overall traffic rate (frame rate) in the BSS, and/or the state of its own buffers holding traffic to be relayed to the wireless end stations in its BSS. Additional variables or factors to consider in determining when to change access mechanism include but are not limited to the following: the number of collisions, the number of packets to be delivered in the queue at the access point, to which stations the packets are to be delivered from the access point, and the number of stations within the access point's basic service set (BSS). The number of collisions may take into account physical and virtual carrier sense collisions. An algorithm that makes use of this information can determine the proper times to enable or disable this alternative access mechanism appropriately.

Figure 6:
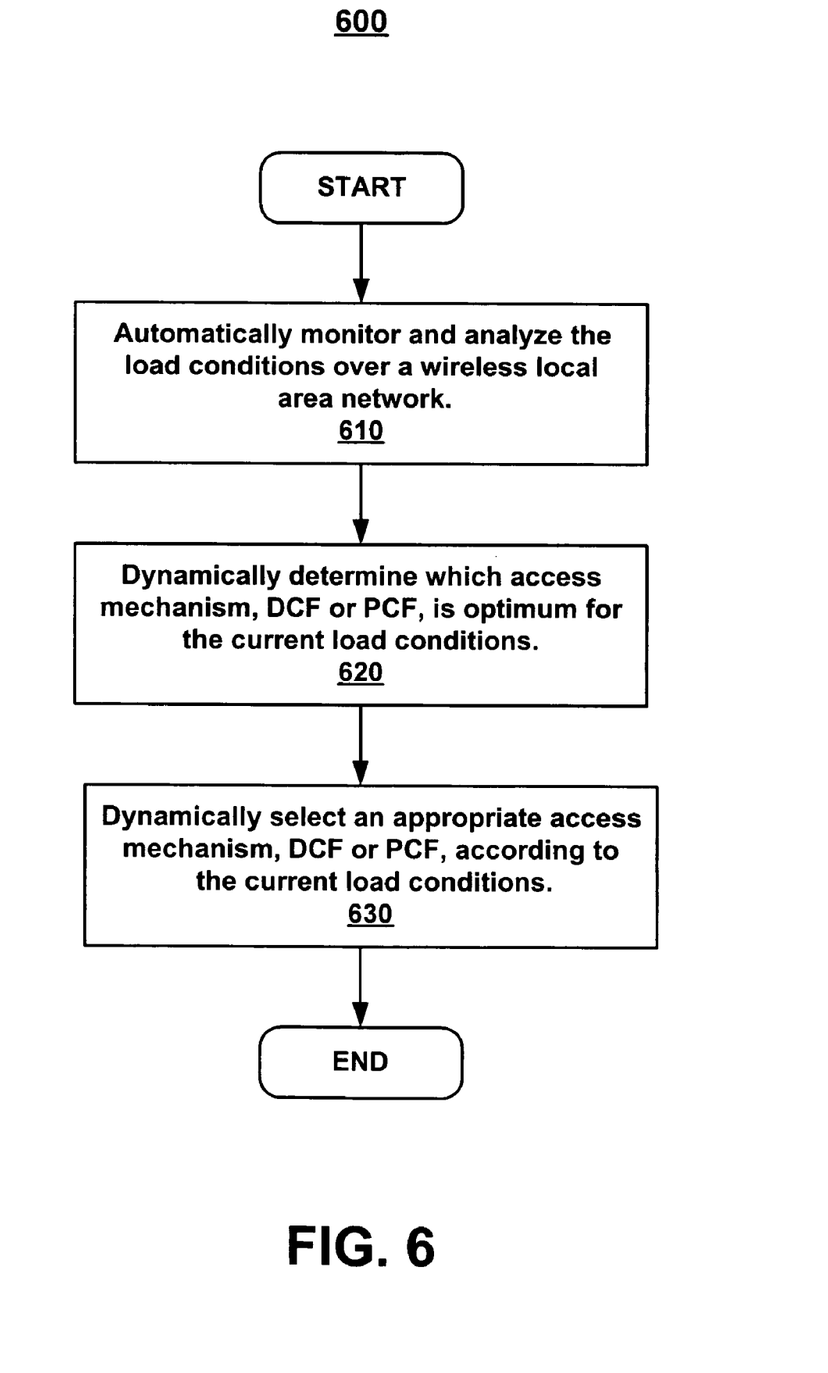
FIG. 6 is a flow chart of steps performed for dynamically determining which of the DCF or PCF access modes is more optimum for the load conditions over a communication network.

FIG. 6 illustrates an exemplary data flow chart 600 of exemplary steps used by the present invention. Flow chart 600 includes processes of the present invention which, in one embodiment, are carried out by a processor under the control of computer-readable and computer-executable instructions. The computer-readable and computer-executable instructions reside, for example, in data storage features such as computer usable volatile memory 102 and/or computer usable non-volatile memory 103 of FIG. 2. The computer-readable and computer-executable instructions are used to control or operate in conjunction with, for example, central processing unit 101 of FIG. 2. Although specific steps are disclosed in flow chart 600 of FIG. 6, such steps are exemplary. That is, the present invention is well suited to performing various other steps or variations of the steps recited in FIG. 6.

In step 610 of flow chart 600, an access point or point coordinator automatically monitors and analyzes the load conditions over a wireless local area network. Some of the factors to consider include but are not limited to the aforementioned variables and factors such as number of collisions over the network, number of stations on the network, and amount of traffic over the network, etc.

In step 620 of flow chart 600, the point coordinator dynamically determines which access mechanism, DCF or PCF, is optimum for the current load conditions. In step 630, the access point dynamically selects an appropriate access mechanism according to the current load conditions. Included within step 630, the access point considers whether there would be sufficient bandwidth gained over the network in relation to the cost, most particularly bandwidth loss, of switching between access mechanisms. This is particularly true when determining if the actual gain in bandwidth is worth the cost of switching from the DCF access mechanism to PCF access mechanism.

The process in flow chart 600 may be repeated continuously, periodically, or asynchronously.

Furthermore, in another embodiment of the present invention, when an access point determines that the PCF access mechanism is optimum for the current load conditions, the access point sends out a beacon to all the stations within its BSS informing the stations when the PCF access mechanism period will start and for what duration. The stations then will update their network allocation vector (NAV) accordingly.

In one embodiment of the present invention, an algorithm would have two values for each of the DCF and PCF access mechanisms: a higher value that would indicate that the alternative PCF access mechanism should be enabled, and a lower value that indicates the alternative PCF access mechanism should be disabled. This would provide some hysteresis, so that the AP does not "thrash" between enabling and disabling the alternative PCF access mechanism. The aforementioned variables and factors that are considered may also be combined in various ways to determine when the alternative PCF access mechanism should be used.

In another embodiment of the present invention, the AP enables the PCF access mechanism to deliver traffic in its buffers to the wireless end stations and to never poll the wireless end stations. This will have the effect of changing the proportion of the bandwidth that the AP may use, increasing the bandwidth available to the AP in proportion to the additional load it offers to the BSS in excess of that offered by the wireless end stations.

For example, initially, in a BSS of nine wireless end stations where there is symmetric access to the network, the wireless end stations and AP operate under the DCF access mechanism. In this example when the AP enables the alternative PCF access mechanism, there will be asymmetric access to the network as determined by the AP. The AP will be able to allocate to itself half of the bandwidth of the BSS to relay traffic to the wireless end stations. The other half of the available bandwidth of the BSS could be shared equally among the mobile units or wireless end stations. It is important to note that the AP controls bandwidth allocation and the AP may determine to allocate all of the bandwidth to itself. This option can be used with any wireless end station, without regard to the implementation of any options in the IEEE 802.11 standard, or its variations.

In another embodiment of the present invention, the AP examines a second set of variables, such as the aforementioned variables and factors, to enable or disable the capability of the AP to poll the wireless end stations for traffic to be relayed from the wireless end stations to other nodes on the network. Enabling the additional capability of the alternative PCF access mechanism to poll the wireless end stations for their traffic will further reduce the bandwidth lost to collisions and extended times between transmissions compared to using the default DCF access mechanism.

The present invention is also well suited to various other embodiments which employ considering other various load networking functions comprised of additional factors, alternate factors, or combinations which include the additional or alternate factors.

The preferred embodiment of the present invention, a method and system for dynamically switching between DCF and PCF access mechanism, is thus described. While the present invention has been described in particular embodiments, it should be appreciated that the present invention should not be construed as limited by such embodiments, but rather construed according to the below claims.

What is claimed is:

1. In a communication network including an access point and a plurality of stations, a method of accessing said communication network, said access point and said plurality of stations operating under a distributed coordination function (DCF) access mechanism as a default access mechanism, comprising steps of:

a) automatically monitoring load conditions over said communication network;

b) automatically analyzing said load conditions to determine which access mechanism, said DCF access mechanism or a point coordination function (PCF) access mechanism, is most appropriate for said load conditions, wherein said automatically analyzing comprises:

assigning a high value in a point coordinator when said PCF access mechanism is most optimum for said load conditions; and       assigning a low value in said point coordinator when said DCF access mechanism is most optimum for said load conditions;

c) dynamically enabling said PCF access mechanism when said PCF access mechanism is most appropriate for said load conditions; and d) dynamically disabling said PCF access mechanism when said DCF access mechanism is most appropriate for said load conditions.

2. The method as described in claim 1, wherein said monitoring and said analyzing in said steps a) and b) respectively are implemented continually.

3. The method as described in claim 1, wherein said monitoring in said step a) and said analyzing in said step b) are implemented periodically.

4. The method as described in claim 1, wherein said monitoring and analyzing in steps a) and b) respectively are implemented asynchronously.

5. The method as described in claim 1, wherein said point coordinator implements said steps a), b), c), and d), said point coordinator located at said access point.

6. The method as described in claim 5, wherein said access point, said plurality of stations, and said point coordinator are substantially compliant with the IEEE 802.11 communications protocol.

7. The method as described in claim 1, comprising further steps of:
   e) automatically polling a first station from said plurality of stations to control transmissions from said first station to said access point and to at least one of said plurality of stations;
   f) automatically polling a second station from said plurality of stations to control transmissions from said second station to said access point and to at least one of said plurality of said stations, independent of and conducted at a different time than step e); and
   g) automatically cancelling all polling of said first and second stations to increase traffic coming from said access point and going to at least one of said plurality of stations.

8. The method as described in claim 1, wherein said step c) is implemented when said high value is assigned, and wherein said step d) is implemented when said low value is assigned.

9. The method as described in claim 1, wherein said step b) considers such factors selected from the group consisting essentially of:
   the rate at which collisions are occurring;
   the number of collisions;
   an overall traffic rate;
   the number of data frames to be delivered from said access point to at least one of said plurality of stations, said data frames located at said access point;
   the total number of said plurality of stations; and
   the destination of said data frames located at said access point.

10. In a communication network including an access point and a plurality of stations, a method of accessing said communication network at a point coordinator located at said access point, said access point and said plurality of stations operating under a distributed coordination function (DCF) access mechanism as a default access mechanism, comprising steps of:
   a) automatically monitoring load conditions over said communication network;
   b) automatically analyzing a factor of a rate at which collisions are occurring over said communication network as a measure of said load conditions on a continual basis to determine which access mechanism, said DCF access mechanism or a point coordination function (PCF) access mechanism, is most appropriate for said load conditions;
   c) dynamically enabling said PCF access mechanism when said PCF access mechanism is most appropriate for said load conditions; and
   d) dynamically disabling said PCF access mechanism when said DCF access mechanism is most appropriate for said load conditions.

11. The method as described in claim 10, wherein said monitoring and said analyzing in said steps a) and b) respectively are implemented continually.

12. The method as described in claim 10, wherein said monitoring in said step a) and said analyzing in said step b) are implemented periodically.

13. The method as described in claim 10, wherein said monitoring and analyzing in steps a) and b) respectively are implemented asynchronously.

14. The method as described in claim 10, wherein said collisions include physical carrier sense collisions and virtual carrier sense collisions.

15. The method as described in claim 14, wherein said access point, said plurality of stations, and said point coordinator are substantially compliant with the IEEE 802.11 communications protocol.

16. The method as described in claim 10, comprising further steps of:
   e) automatically polling a first station from said plurality of stations to control transmissions from said first station to said access point and to at least one of said plurality of stations;
   f) automatically polling a second station from said plurality of stations to control transmissions from said second station to said access point and to at least one of said plurality of said stations, independent of and conducted at a different time than step e); and
   g) automatically cancelling all polling of said first and second stations to increase traffic coming from said access point and going to at least one of said plurality of stations.

17. The method as described in claim 10, wherein said step b) comprises the further step of assigning a high value in said point coordinator when said PCF access mechanism is most optimum for said load conditions;
   assigning a low value in said point coordinator when said DCF access mechanism is most optimum for said load conditions.

18. The method as described in claim 17, wherein said step c) is implemented when said high value is assigned, and wherein said step d) is implemented when said low value is assigned.

19. The method as described in claim 10, wherein said step b) considers additional factors selected from the group consisting essentially of:
   the number of collisions;
   an overall traffic rate;
   the number of data frames to be delivered from said access point to at least one of said plurality of stations, said data frames located at said access point;
   the total number of said plurality of stations; and
   the destination of said data frames located at said access point.

20. A computer system comprising a processor, a memory unit, and a display screen wherein said memory contains instructions that when executed implement in a communication network including an access point and a plurality of stations a method of accessing said communication network, said access point and said plurality of stations operating under a distributed coordination function (DCF) access mechanism as a default access mechanism, comprising steps of:
- a) automatically monitoring load conditions over said communication network;
- b) automatically analyzing said load conditions to determine which access mechanism, said DCF access mechanism or a point coordination function (PCF) access mechanism, is most appropriate for said load conditions, wherein said automatically analyzing comprises:
  assigning a high value in a point coordinator when said PCF access mechanism is most optimum for said load conditions; and
  assigning a low value in said point coordinator when said DCF access mechanism is most optimum for said load conditions;
- c) dynamically enabling said PCF access mechanism when said PCF access mechanism is most appropriate for said load conditions; and
- d) dynamically disabling said PCF access mechanism when said DCF access mechanism is most appropriate for said load conditions.

21. A computer system as described in claim 20, wherein said monitoring and said analyzing in said steps a) and b) respectively are implemented continually.

22. A computer system as described in claim 20, wherein said monitoring in said step a) and said analyzing in said step b) are implemented periodically.

23. A computer system as described in claim 20, wherein said monitoring and analyzing in steps a) and b) respectively are implemented asynchronously.

24. A computer system as described in claim 20, wherein said point coordinator implements said steps a), b), c), and d), said point coordinator located at said access point.

25. A computer system as described in claim 24, wherein said access point, said plurality of stations, and said point coordinator are substantially compliant with the IEEE 802.11 communications protocol.

26. A computer system as described in claim 20, comprising further steps of:
- e) automatically polling a first station from said plurality of stations to control transmissions from said first station to said access point and to at least one of said plurality of stations;
- f) automatically polling a second station from said plurality of stations to control transmissions from said second station to said access point and to at least one of said plurality of said stations, independent of and conducted at a different time than step e); and
- g) automatically cancelling all polling of said first and second stations to increase traffic coming from said access point and going to at least one of said plurality of stations.

27. A computer system as described in claim 20, wherein said step c) is implemented when said high value is assigned, and wherein said step d) is implemented when said low value is assigned.

28. A computer system as described in claim 20, wherein said step b) considers such factors selected from the group consisting essentially of:
  the rate at which collisions are occurring;
  the number of collisions;
  an overall traffic rate;
  the number of data frames to be delivered from said access point to at least one of said plurality of stations, said data frames located at said access point;
  the total number of said plurality of stations; and
  the destination of said data frames located at said access point.

* * * * *